(12) United States Patent
Jeong et al.

(10) Patent No.: US 10,149,341 B2
(45) Date of Patent: *Dec. 4, 2018

(54) METHOD AND APPARATUS FOR CONTROLLING RANDOM ACCESS IN WIRELESS COMMUNICATION SYSTEM SUPPORTING CARRIER AGGREGATION

(71) Applicant: Samsung Electronics Co., Ltd., Suwon-si, Gyeonggi-do (KR)

(72) Inventors: Kyeong In Jeong, Suwon-si (KR); Gert-Jan Van Lieshout, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 273 days.

This patent is subject to a terminal disclaimer.

(21) Appl. No.: 14/449,617

(22) Filed: Aug. 1, 2014

(65) Prior Publication Data

US 2014/0341011 A1 Nov. 20, 2014

Related U.S. Application Data

(63) Continuation of application No. 13/440,152, filed on Apr. 5, 2012, now Pat. No. 8,824,310.

(Continued)

(30) Foreign Application Priority Data

Apr. 5, 2012 (KR) .................... 10-2012-0035228

(51) Int. Cl.
*H04W 76/19* (2018.01)
*H04L 5/00* (2006.01)
(Continued)

(52) U.S. Cl.
CPC .......... *H04W 76/19* (2018.02); *H04L 5/0098* (2013.01); *H04W 28/04* (2013.01);
(Continued)

(58) Field of Classification Search
CPC ..... H04L 5/001; H04L 5/0007; H04L 5/0053; H04W 24/10; H04W 28/04; H04W 28/06;
(Continued)

(56) References Cited

U.S. PATENT DOCUMENTS 8,649,288 B2 2/2014 He et al.
8,824,310 B2 * 9/2014 Jeong et al. .................. 370/242
(Continued)

FOREIGN PATENT DOCUMENTS

CN 101651899 A 2/2010
CN 101841889 A 9/2010
(Continued)

OTHER PUBLICATIONS

ZTE, Consideration on SCell RLM in Carrier Aggregation, 3GPP TSG-RAN WG4 meeting AH#4, R4-103527, Oct. 7, 2010, p. 2, lines 16, 17, Xi'an, China.

(Continued)

*Primary Examiner* — Chirag G Shah
*Assistant Examiner* — Srinivasa R Reddivalam
(74) *Attorney, Agent, or Firm* — Jefferson IP Law, LLP (57) ABSTRACT

A random access procedure control method and apparatus is provided for controlling a random access procedure efficiently in a mobile communication system supporting carrier aggregation. The method for controlling random access procedure of a terminal in a wireless communication system having a primary cell and at least one secondary cell includes initiating a random access procedure in the primary cell and the at least one secondary cells, detecting a random access failure of a terminal performing the random access procedure, determining whether the random access failure is detected in the primary cell or the at least one secondary cell, and determining whether to continue the random access (Continued)

procedure according to a result of the determining of whether the random access failure is detected.

10 Claims, 8 Drawing Sheets

Related U.S. Application Data (60) Provisional application No. 61/471,872, filed on Apr. 5, 2011, provisional application No. 61/592,568, filed on Jan. 30, 2012.

(51) Int. Cl.
*H04W 74/08* (2009.01)
*H04W 28/04* (2009.01)
*H04W 24/04* (2009.01)

(52) U.S. Cl.
CPC ... *H04W 74/0833* (2013.01); *H04W 74/0858* (2013.01); *H04W 24/04* (2013.01)

(58) Field of Classification Search
CPC .............. H04W 36/08; H04W 52/146; H04W 56/0005; H04W 56/0045; H04W 72/0406; H04W 72/042; H04W 74/002; H04W 74/08; H04W 74/0833
See application file for complete search history.

(56) References Cited

U.S. PATENT DOCUMENTS

| | | |
|---|---|---|
| 8,867,440 B2 | 10/2014 | Ho et al. |
| 9,237,419 B2 | 1/2016 | Jung et al. |
| 9,307,498 B2 | 4/2016 | Baldemair et al. |
| 2009/0232118 A1 | 9/2009 | Wang et al. |
| 2009/0239525 A1 | 9/2009 | Cai et al. |
| 2009/0245191 A1 | 10/2009 | Ball et al. |
| 2010/0093386 A1 | 4/2010 | Damnjanovic et al. |
| 2010/0103873 A1 | 4/2010 | Buracchini |
| 2010/0159919 A1 | 6/2010 | Wu |
| 2010/0240372 A1 | 9/2010 | Wu |
| 2010/0296467 A1 | 11/2010 | Pelletier et al. |
| 2011/0038277 A1 | 2/2011 | Hu et al. |
| 2011/0039552 A1 | 2/2011 | Narasimha et al. |
| 2011/0051609 A1 | 3/2011 | Ishii et al. |
| 2011/0086659 A1 | 4/2011 | Yoon et al. |
| 2011/0103328 A1* | 5/2011 | Lee et al. ............ 370/329 |
| 2011/0117905 A1 | 5/2011 | Huang et al. |
| 2011/0134774 A1* | 6/2011 | Pelletier et al. ............ 370/252 |
| 2011/0158116 A1 | 6/2011 | Tenny et al. |
| 2011/0195668 A1 | 8/2011 | Lee et al. |
| 2011/0250910 A1 | 10/2011 | Lee et al. |
| 2011/0299415 A1 | 12/2011 | He et al. |
| 2012/0002555 A1 | 1/2012 | Ohuchi et al. |
| 2012/0051251 A1 | 3/2012 | Seo et al. |
| 2012/0063302 A1* | 3/2012 | Damnjanovic et al. ...... 370/228 |
| 2012/0069788 A1 | 3/2012 | Shen et al. |
| 2012/0300701 A1 | 11/2012 | Uemura et al. |
| 2013/0121203 A1 | 5/2013 | Jung et al. |
| 2013/0188473 A1* | 7/2013 | Dinan ............ 370/216 |
| 2014/0016623 A1 | 1/2014 | Bai et al. |
| 2014/0023032 A1 | 1/2014 | Kim et al. |
| 2014/0242974 A1 | 8/2014 | Lee et al. |
| 2016/0081045 A1 | 3/2016 | Bostrom et al. |
| 2017/0195020 A1 | 7/2017 | Ko et al. |

FOREIGN PATENT DOCUMENTS

| | | |
|---|---|---|
| CN | 101998475 A | 3/2011 |
| CN | 101998661 A | 3/2011 |
| CN | 103119996 A | 5/2013 |
| CN | 103141041 A | 6/2013 |
| EP | 2 214 448 A1 | 8/2010 |
| JP | 2009-049465 A | 3/2009 |
| JP | 2011-508559 A | 3/2011 |
| JP | 2011-124713 A | 6/2011 |
| JP | 2012-531121 A | 12/2012 |
| JP | 2013-533673 A | 8/2013 |
| JP | 2014-506059 A | 3/2014 |
| KR | 10-2009-0101796 A | 9/2009 |
| KR | 10-2010-0105438 A | 9/2010 |
| KR | 10-2010-0126509 A | 12/2010 |
| KR | 10-2010-0133477 A | 12/2010 |
| KR | 10-2010-0137531 A | 12/2010 |
| KR | 10-2011-0093642 A | 8/2011 |
| KR | 10-2011-0109992 A | 10/2011 |
| RU | 2426251 C2 | 8/2011 |
| WO | 2009/096745 A2 | 8/2009 |
| WO | 2010/065759 A2 | 6/2010 |
| WO | 2010-103895 A1 | 9/2010 |
| WO | 2010-124228 A2 | 10/2010 |
| WO | 2010124228 A2 | 10/2010 |
| WO | 2010/127520 A1 | 11/2010 |
| WO | 2010/148404 A1 | 12/2010 |
| WO | 2011/002789 A1 | 1/2011 |
| WO | 2011-093666 A2 | 8/2011 |
| WO | 2012-141483 A2 | 10/2012 |
| WO | 2013-051836 A1 | 4/2013 |
| WO | 2013-051912 A2 | 4/2013 |
| WO | 2013-065995 A2 | 5/2013 |

OTHER PUBLICATIONS

3rd Generation Partnership Project; Technical Specification Group Radio Access Network; Evolved Universal Terrestrial Radio Access (E-UTRA); Medium Access Control (MAC) protocol specification (Release 10), Dec. 17, 2010, p. 14, paragraph 5.1.4-p. 17, paragraph 5.1.5, 3GPP TS 36.321, V10.0.0, Sophia Antipolis, France.
Alcatel-Lucent et al, DL reference & the need of TA grouping for multiple TA, TSG-RAN WG2#73bis, R2-112208, Apr. 4, 2011, Shanghai, China.
ZTE, Discussion on Multiple TA, 3GPP TSG-RAN WG2 Meeting #73bis, R2-111908, Apr. 4, 2011, Shanghai, China.
Potevio, Miscellaneous corrections to TS36.300 on Carrier Aggregation, 3GPP TSG-RAN WG2 Meeting #72bis, R2-110188, Jan. 11, 2011, pp. 3,4,7,8, Dublin, Ireland.
Samsung, Failure of RACH on SCell, 3GPP TSG RAN WG2#76, R2-116308, Nov. 8, 2011, San Francisco, USA.
Samsung, On prioritizing MCG uplink transmission in power limited state, 3GPP TSG-RAN WG2 Meeting #85bis, R2-141399, Mar. 22, 2014, Valencia, Spain.
Samsung, Radio Link Failure in dual connectivity, 3GPP TSG-RAN WG2 Meeting #85, R2-140238, Feb. 9, 2014, Prague, Czech.
3rd Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2(Release 10)", 3GPP TS 36.300 V10.2.0 (Dec. 2010), Dec. 21, 2010.
New Postcom, "Analysis on SCell Radio Link Monitoring", 3GPP TSG RAN WG2 #72, R2-106351, Nov. 7, 2010.
Ericsson et al.; Accessibility measurements for MDT; 3GPP TSG-RAN WG2 #76; Tdoc R2-116148; Oct. 14-18, 2011; San Francisco, CA.
Ericsson et al.; Timing Advance Maintenance for SCells; 3GPP TSG-RAN WG2 #77bis; Tdoc R2-121558; Mar. 26-30, 2012; Jeju, South Korea.
3GPP; 3rd Generation Partnership Project; Technical Specification Group Radio Access Network; Study on Minimization of drive-tests in Next Generation Networks; (Release 9); 3GPP TR 36.805; V9.0.0; Dec. 2009; France.
Interdigital; PHR Triggering for SAR; 3GPP TSG RAN WG2 #72-bis; R2-110220; Jan. 17-21, 2011; Dublin, Ireland.
Qualcomm Incorporated; PHR Trigger for Power Reduction Due to Power Management; 3GPP TSG-RAN2 Meeting #73; R2-110797; Feb. 21-25, 2011; Taipei, Taiwan.
Ericsson et al.; 3GPP TSG-RAN WG2#73; Tdoc R2-110941; Feb. 21-25, 2011; Taipei, Taiwan.

(56) References Cited

OTHER PUBLICATIONS

LTE; 23.1 RRC Connection Establishment; www.lte-bullets.com; Aug. 12, 2011.
Qualcomm Incorporated, Power Management Based PHR Trigger, 3GPP TSG-RAN2 Meeting #72bis, R2-110177, Jan. 17-21, 2011, Dublin, Ireland.
Samsung, Discussion on CQI/SRS transmission during DRX, 3GPP TSG-RAN2 #75 Meeting, R2-114180, XP050539989, Aug. 22-26, 2011, Athens, Greece.
Korean Office Action dated May 14, 2018, issued in Korean Application No. 10-2012-0015361.
Australian Office Action dated Jun. 5, 2018, issued in Australian Application No. 2017203059.
European Office Action dated Jul. 24, 2018, issued in European Application No. 12 839 782.5-1214.
Ericsson et al: "Adding a Power Management indication in PHR", 3GPP Draft; 36321_CRXXXX_(REL-10)_R2-110940 Adding a Power Management Indicator in PHR, 3rd Generation Partnership Project (3GPP), Mobile Competence Centre ; 650, Route Des Lucioles ; F-06921 Sophia-Antipolis Cedex ; France, vol. RAN WG2, no. Taipei, Taiwan; Feb. 21, 2011-Feb. 25, 2011, Feb. 14, 2011 (Feb. 14, 2011), XP050605646, [retrieved on Feb. 14, 2011]. "3rd Generation Partnership Project; Technical Specification Group Radio Access Network; Evolved Universal Terrestrial Radio Access (EUTRA); Medium Access Control (MAC) protocol specification (Release 10)", 3GPP Standard; 3GPP TS 36.321,3rd Generation Partnership Project (3GPP), Mobile Competence Centre ; 650, Route Des Lucioles ; F-06921 Sophia-Antipolis Cedex ; France, No. V10.0.0, Dec. 17, 2010 (Dec. 17, 2010), pp. 1-53, XP050462124, [retrieved on Dec. 17, 2010].
Ail rapporteur (NTT DOCOMO, Inc.), CA support for multi-TA[online], 3GPP TSG-RAN#69 R2-101567, internet <URL: http://www.3gpp.org/ftp/tsg_ran/WG2_RL2/TSGR2_69/Docs/R2-101567.zip>, Feb. 2010.
Huawei et al., 'The MDT applicability of EPLMN', 3GPP Change Request; R2-114011, 3GPP TSG-RAN WG2 #75, Athens, Greece, Aug. 22 to 26, 2011, pp. 1-16.
'3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 10)', 3GPP TS 37.320, V10.4.0, Dec. 2011, pp. 1-18.
"3rd Generation Partnership Project; Technical Specification Group Radio Access Network; Evolved Universal Terrestrial Radio Access (EUTRA); Medium Access Control (MAC) protocol specification (Release 10)", 3GPP Standard; 3GPP TS 36.321 V10.1.0, Mar. 2011.
"3rd Generation Partnership Project; Technical Specification Group Radio Access Network; Evolved Universal Terrestrial Radio Access (EUTRA); Medium Access Control (MAC) protocol specification (Release 10)", 3GPP Standard; 3GPP TS 36.321 V10.0.0, Dec. 2010.
"3rd Generation Partnership Project; Technical Specification Group Radio Access Network; Evolved Universal Terrestrial Radio Access (EUTRA); Medium Access Control (MAC) protocol specification (Release 10)", 3GPP Standard; 3GPP TS 36.331 V10.0.0, Dec. 2010.
CCL/ITRI; Random Access Transmission with Prioirity in E-UTRA Uplink; 3GPP TSG RAN WG1 LTE Ad Hoc Meeting; R1-060140; Jan. 23-25, 2006; Helsinki, Finland.
Qualcomm Incorporated; Definition of Pcmax,c; 3GPP TSG RAN4 #57AH; R4-110567; Jan. 17-21, 2010; Austin, TX.
Alcatel-Lucent et al.; Introduction of new PHR trigger to indicate the configured maximum UE power variation.; 3GPP TSG-RAN2 Meeting #72; R2-106896; Nov. 15-19, 2010; Jacksonville, FL.
3GPP; 3rd Generation Partnership Project; Technical Specification Group Radio Access Network; Evolved Universal Terrestrial Radio Access (E-UTRA); Medium Access Control (MAC) protocol specification (Release 10); 3GPP TS 36.321; V10.0.0; Dec. 2010.
3GPP; 3rd Generation Partnership Project; Technical Specification Group Radio Access Network; Evolved Universal Terrestrial Radio Access (E-UTRA); Radio Resource Control (RRC) Protocol specification (Release 10); 3GPP TS 36.331; V10.0.0; Dec. 2010.
Mediatek Inc.; Rel-10 PHR for non-CA UE; 3GPP TSG-RAN WG2 Meeting #72bis; R2-110244; Jan. 17-21, 2011; Dublin, Ireland.
Ericsson et al.; Adding a Power Management indication in PHR; 3GPP TSG-RAN2 Meeting #73; R2-110940; Feb. 21-25, 2011; Taipei, Taiwan.
Ericsson et al.; Power Management indication in PHR; 3GPP TSG-RAN2 WG2#73; R2-110941; Feb. 21-25, 2011; Taipei, Taiwan.
Ericsson et al.; Adding a Power Management indication in PHR; 3GPP TSG-RAN2 Meeting #73; R2-111601; Feb. 21-25, 2011; Taipei, Taiwan.
Fujitsu, Clarifications on PHR, 3GPP TSG-RAN WG2#72bis, R2-110214, Jan. 17-21, 2011.
Ericsson, ST-Ericsson, Corrections to the Carrier Aggregation Functionality in MAC, 3GPP TSG-RAN WG2#72bis, R2-110664, Feb. 14, 2011.
Interdigital Communications, TAT Operation in LTE 11 CA, 3GPP Draft, R2-114265 (REL-11 Timing Advance Timer LTE CA), 3rd Generation Parternship Project (3GPP), Mobile Competence Centre, 650, XP050540023, Aug. 16, 2011.
European Office Action dated Feb. 21, 2018, issued in European Application No. 12 767 780.5-1207.
Japanese Office Action dated Feb. 19, 2018, issued in Japanese Application No. 2016-255664.
Korean Office Action dated Mar. 14, 2018, issued in Korean Application No. 10-2012-0035570.
LTE; Evolved Universal Terrestrial Radio Access (E-UTRA); Physical layer procedures (Release 10), 3GPP TS 36.213 V10.0.1; Jan. 2011.
ZTE: Impact analysis of multipe TA, 3GPP TSG RAN WG2 #68bis Draft; R2-100308. Valencia, Spain, Jan. 18-22, 2010.
Korean Intellectual Property Office Action dated Sep. 17, 2018, issued in Korean Application No. 10-2012-0035238.
Indian Office Action dated Aug. 31, 2018, issued in the Indian Application No. 2437/KOLNP/2013.

\* cited by examiner

METHOD AND APPARATUS FOR CONTROLLING RANDOM ACCESS IN WIRELESS COMMUNICATION SYSTEM SUPPORTING CARRIER AGGREGATION

CROSS-REFERENCE TO RELATED APPLICATIONS

This application is a continuation application of a prior application Ser. No. 13/440,152, filed on Apr. 5, 2012, which claimed the benefit under 35 U.S.C. § 119(e) of a U.S. Provisional application filed on Apr. 5, 2011 in the U.S. Patent and Trademark Office and assigned Ser. No. 61/471,872, a U.S. Provisional application filed on Jan. 30, 2012 in the U.S. Patent and Trademark Office and assigned Ser. No. 61/592,568, and under 35 U.S.C. § 119(a) of a Korean patent application filed on Apr. 5, 2012 in the Korean Intellectual Property Office and assigned Ser. No. 10-2012-0035228 the entire disclosure of each of which is hereby incorporated by reference.

BACKGROUND OF THE INVENTION

1. Field of the Invention

The present invention relates to a mobile communication system. More particularly, the present invention relates to a method and apparatus for controlling a random access process efficiently in a mobile communication system supporting carrier aggregation.

2. Description of the Related Art

Mobile communication systems provide subscribers and users of the mobile communication systems with voice communication services while on the move. With the advancement of mobile communication technologies, mobile communications have evolved to support high speed data communication services as well as the voice communication services. Recently, as one of the next generation mobile communication systems, Long Term Evolution (LTE) is a system being standardized by the $3^{rd}$ Generation Partnership Project (3GPP). LTE systems provide high speed packet-based communication of up to 100 Mbps and are now being commercially deployed.

Unlike the standard voice services, data services are allocated resources according to an amount of data to be transmitted and a channel condition for the transmission. Accordingly, in a wireless communication system, such as cellular communication system, it is important to manage resource allocation based on a resource scheduled for data transmission, a channel condition, and an amount of data to be transmitted. This resource management is important in LTE systems as well, and a scheduler located at an enhanced Node B (eNB) of the LTE system manages and assigns radio resources. Recent research and development is focused on the LTE-Advanced (LTE-A) system for improving a data transmission rate with the adaptation of several new techniques to a legacy LTE system.

Carrier Aggregation is one of these new techniques. Unlike a typical communication system using an uplink as a signal carrier in uplink and downlink transmissions between a User Equipment (UE) and an eNB, carrier aggregation makes it possible to combine a primary carrier and at least one secondary carrier in order to increase a transmission/reception data transmission rate in proportion to a number of aggregated carriers. In an LTE-A system, a cell operating on the primary carrier is referred to as a primary cell (or may also be referred to as a PCell or a first cell), and a cell operating on a secondary carrier is referred to as a secondary cell (or may also be referred to as an SCell or second cell).

Meanwhile, in a case where locations of antennas responsible for radio communication on the primary and secondary carriers are determined in consideration of the introduction of a repeater and/or a Remote Radio Head (RRH) (e.g., a transmit/receive antenna operating on the primary carrier may be located at a position of the eNB while an antenna operating on the secondary carrier is located at the position of the RRH), uplink timings are configured rfor the receive antennas near and far from the UE differently according to a location of the UE. Accordingly, when a plurality of uplink timings are configured in the communication system, there is a need of a method for controlling the random access procedure in order to acquire a plurality of uplink timings efficiently. Accordingly, there is a need for a method for handling a problem and/or failure of a random access procedure efficiently so as to acquire multiple uplink timings configured in the mobile communication system.

SUMMARY OF THE INVENTION

Aspects of the present invention are to address at least the above-mentioned problems and/or disadvantages and to provide at least the advantages described below. Accordingly, an aspect of the present invention is to provide a method for controlling a random access procedure in a mobile communication system supporting carrier aggregation.

In accordance with an aspect of the present invention, a method for controlling random access procedure of a terminal in a wireless communication system configured with a primary cell and at least one secondary cell is provided. The method includes initiating a random access procedure in the primary cell and the at least one secondary cell, detecting a random access failure of a terminal performing the random access procedure, determining whether the random access failure is detected in the primary cell or the at least one secondary cell, and determining whether to continue the random access procedure according to a result of the determining whether the random access failure is detected.

In accordance with another aspect of the present invention, a terminal for attempting random access to a base station in a wireless communication system having a primary cell and at least one secondary cell is provided. The terminal includes a transceiver for communicating signals with the base station, and a controller for initiating a random access procedure in the primary and the at least one secondary cell, for detecting a random access failure of the terminal attempting the random access, for determining whether the random access failure is detected in the primary cell or the at least on secondary cell, and for determining whether to continue the random access procedure according to a result of the determining whether the random access failure is detected.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of present invention provide a method for handling a random access problem and/or failure arising in a random access procedure for acquiring uplink timings configured in association with carrier aggregation according to whether the random access procedure is for a Primary Cell (PCell) or a Secondary Cell (SCell). If a random access problem and/or failure has arose in the PCell, a Medium Access Control (MAC) layer entity notifies a Radio Resource Control (RRC) entity of the random access problem and/or failure in a User Equipment (UE) which has detected the problem and/or failure. Next, the RRC entity performs an RRC Connection Re-establishment, and the corresponding RRC Connection Reconfiguration operation, in order to re-establish a connection with an enhanced Node B (eNB). If the connection reestablishment is successful, then the RRC entity reconfigures a Signaling Radio Bearer and a Data Radio Bearer and restarts Ciphering/Integrity protection check. Otherwise, if the random access problem and/or failure has arisen in the SCell, the MAC layer entity of the UE, which has detected the problem and/or failure, suspends the random access procedure. In this case, the MAC layer entity does not notify the RRC layer entity of the random access problem and/or failure that arose in the SCell.

In more detail, the random access control method of a UE in a mobile communication system configured with a primary cell and at least one secondary cell includes attempting random access through the primary and second cells, detecting a failure of the random access, determining whether the random access failure has arose in the primary cell or the secondary cell, and determining whether to continue the random access procedure according to whether the random access failure arose in the primary cell or the secondary cell.

A UE attempting random access to an eNB in a mobile communication system configured with a primary cell and at least one secondary cell includes a transceiver for communicating signals with the eNB, and a controller for controlling attempting of random access through the primary and second cells, for detecting a failure of the random access, for determining whether the random access failure has arisen in the primary cell or the secondary cell, and for determining whether to continue the random access procedure according to whether the random access failure arose in the primary cell or the secondary cell.

Figure 1:
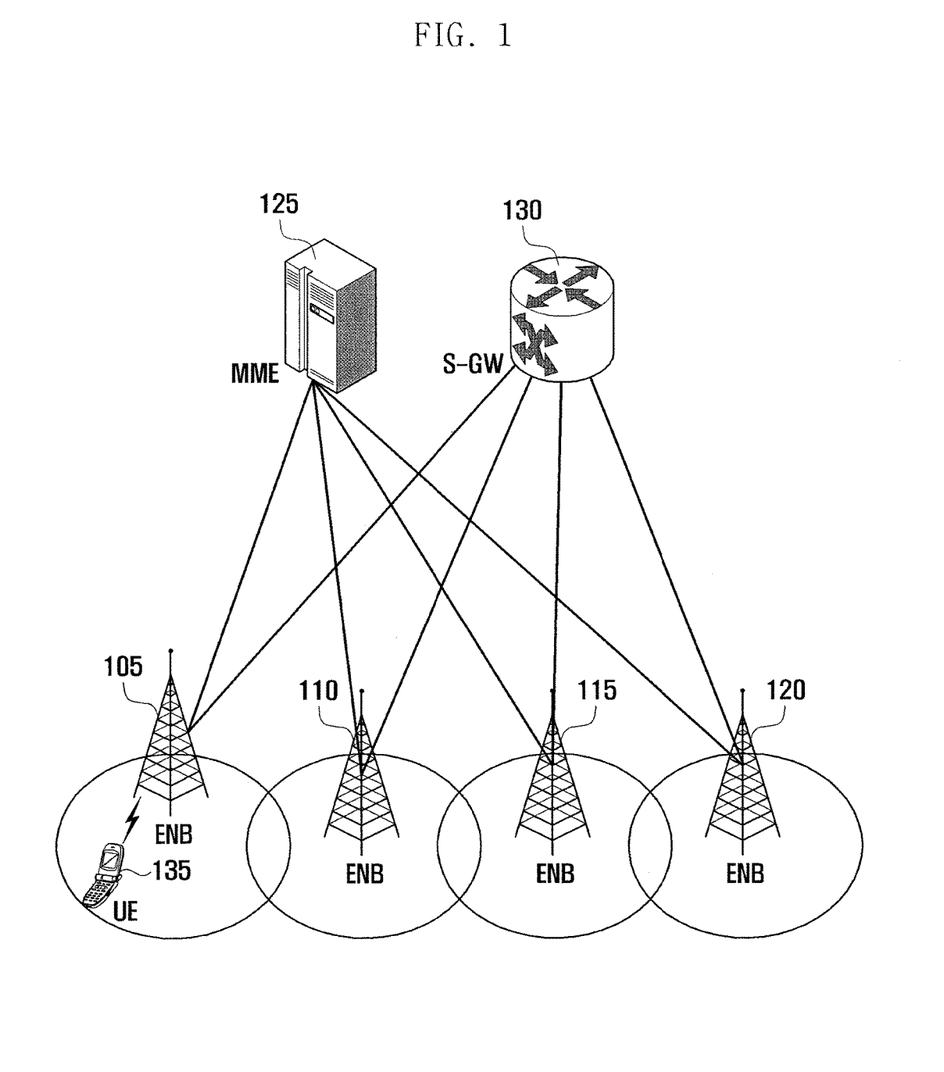
FIG. 1 is a diagram illustrating an architecture of a Long Term Evolution (LTE) system according to an exemplary embodiment of the present invention.

FIG. 1 is a diagram illustrating an architecture of an LTE system according to an exemplary embodiment of the present invention.

Referring to FIG. 1, a radio access network of the mobile communication system includes eNBs 105, 110, 115, and 120, a Mobility Management Entity (MME) 125, and a Serving-Gateway (S-GW) 130.

A UE 135 connects to an external network via the eNBs 105, 110, 115, and 120 and the S-GW 130. In FIG. 1, the eNBs 105, 110, 115, and 120 correspond to legacy node Bs of a Universal Mobile Communications System (UMTS).

The eNBs 105, 110, 115, and 120 allow the UE to establish a radio link and are responsible for more complicated functions as compared to the legacy node B. In the LTE system, all user traffic, including real time services such as Voice over Internet Protocol (VoIP), are provided through a shared channel. Thus, there is a need for a device which is located in the eNB to schedule data based on state information, such as UE buffer conditions, a power headroom state, and a channel state.

Typically, one eNB controls a plurality of cells. In order to secure a data rate of up to 100 Mbps, the LTE system adopts Orthogonal Frequency Division Multiplexing (OFDM) as a radio access technology. Also, the LTE system adopts Adaptive Modulation and Coding (AMC) in order to determine a modulation scheme and a channel coding rate in adaptation to the channel condition of the UE.

The S-GW 130 provides data bearers so as to establish and release the data bearers under a control of the MME 125. The MME 125 is responsible for various control functions and is connected to a plurality of the eNBs 105, 110, 115, and 120.

Figure 2:
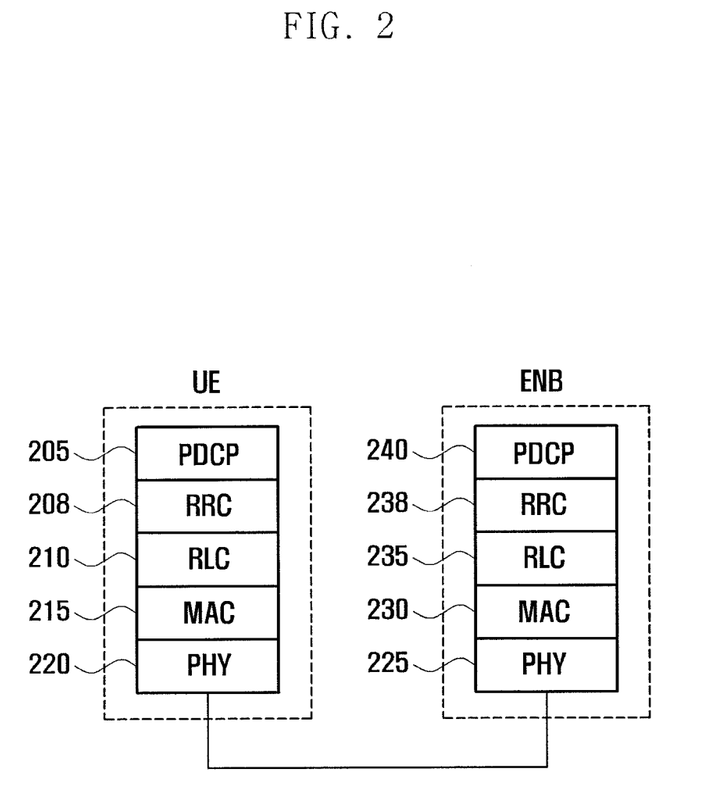
FIG. 2 is a diagram illustrating a protocol stack of an LTE system according to an exemplary embodiment of the present invention.

FIG. 2 is a diagram illustrating a protocol stack of the LTE system according to an exemplary embodiment of the present invention.

Referring to FIG. 2, the protocol stack of the LTE system, employed by the UE and the eNB, includes Packet Data Convergence Protocol (PDCP) layer 205 and 240, RRC layer 208 and 238, Radio Link Control (RLC) layer 210 and 235, MAC layer 215 and 230, and Physical (PHY) layer 220 and 225.

The PDCP layer 205 and 240 is responsible for Internet Protocol (IP) header compression, decompression and ciphering of the radio protocol and for performing an Integrity Protection Check. The RRC layer 208 and 238 defines control information message transmission and related operations and procedures for higher layers and for handling a radio resource. The RLC layer 210 and 235 is responsible for reconfiguring the PDCP Protocol Data Unit (PDU) into an appropriate size.

The MAC 215 and 230 layer is responsible for establishing a connection to a plurality of RLC entities so as to multiplex the RLC PDUs into MAC PDUs and demultiplex the MAC PDUs into RLC PDUs. The PHY layer 220 and 225 performs channel coding on the MAC PDU and modulates the MAC PDU into OFDM symbols in order to transmit the symbols over a radio channel and performs demodulating and channel-decoding on received OFDM symbols and delivers the decoded data to the higher layer.

Figure 3:
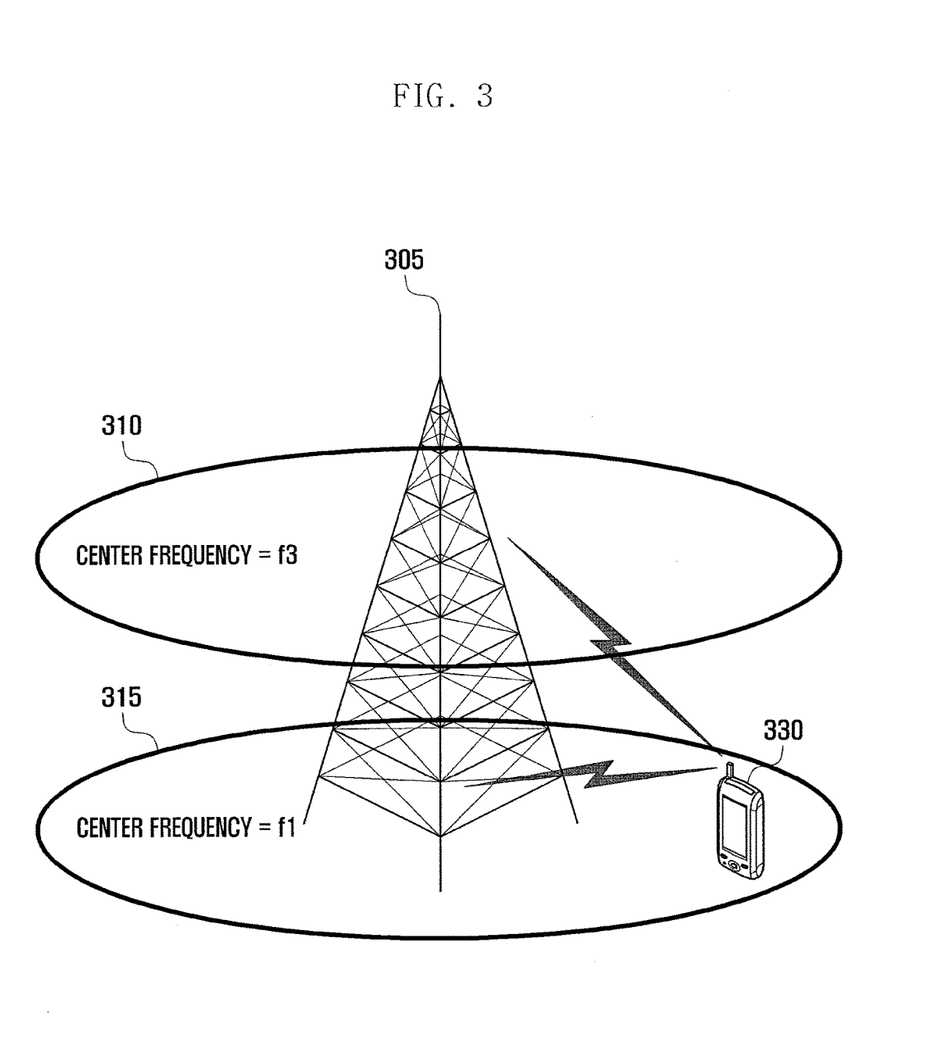
FIG. 3 is a diagram illustrating carrier aggregation in an LTE system according to an exemplary embodiment of the present invention.

FIG. 3 is a diagram illustrating carrier aggregation in an LTE system according to an exemplary embodiment of the present invention.

Typically, an eNB may use multiple carriers to transmit and receive signals in different frequency bands. For example, when an eNB 305 operates on a carrier 315 with center frequency fl and a carrier 310 with center frequency f3, then the eNB 305 uses one of the two carriers for receiving data.

However, a UE 330, having the carrier aggregation capability, may transmit and/or receive data using both the carriers 310 and 315. The eNB 305 may increase the amount of the resource to be allocated to the UE 330 in adaptation to the channel condition of the UE 330 so as to improve the data transmission rate of the UE 330. Although the description is directed to the case of a transmission carrier, the same may be applied to a case of a reception carrier in view of the eNB 305. Unlike the legacy UE which can use one of multiple carriers, the UE 330 having the carrier aggregation capability may use multiple carriers simultaneously in order to increase the data transmission rate.

By determining that a cell is configured with one downlink carrier and one uplink carrier, the carrier aggregation may be understood to operate as if the UE communicates data via multiple cells. With the use of carrier aggregation, the maximum data transmission rate increases in proportion to a number of aggregated carriers.

In the following description, the phrase, recitation, or similarly recited phrase, "the UE receives data through a certain downlink carrier or transmits data through a certain uplink carrier" means that the UE transmits or receives data through control and data channels provided in a cell corresponding to a center frequencies and frequency bands of the downlink and uplink carriers. Although the description is directed to an LTE mobile communication system for explanation convenience, the present invention is not limited thereto, and may be applied to other types of wireless communication systems supporting carrier aggregation.

Figure 4:
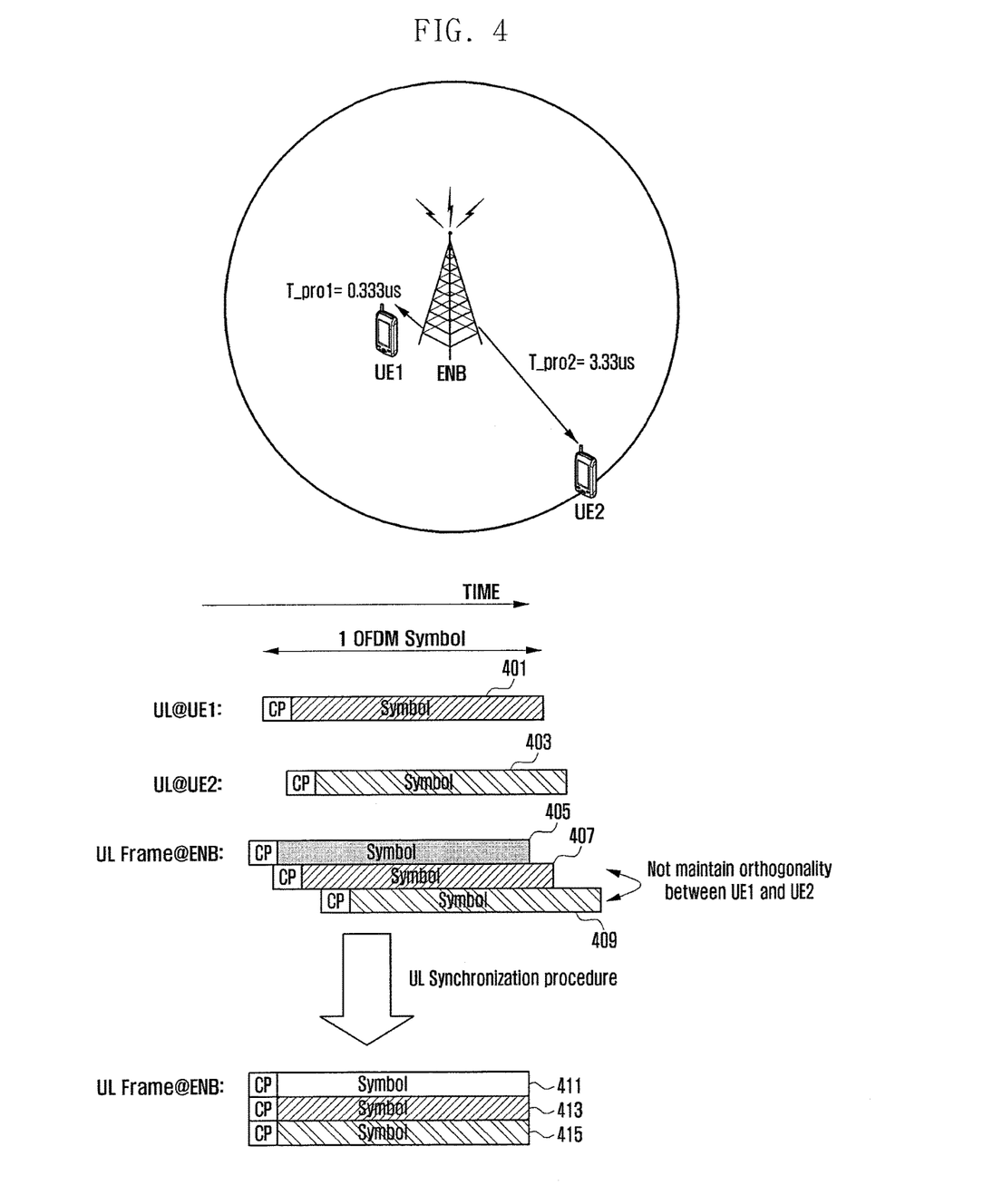
FIG. 4 is a diagram illustrating uplink timing synchronization in an Orthogonal Frequency Division Multiplexing (OFDM) based $3^{rd}$ Generation Partnership Project (3GPP) LTE system according to an exemplary embodiment of the present invention.

FIG. 4 is a diagram illustrating uplink timing synchronization in an OFDM-based $3^{rd}$ Generation Partnership Project (3GPP) LTE system according to an exemplary embodiment of the present invention.

A UE 1 is located near an eNB while a UE 2 is located farther from the eNB than the UE 1. T_pro1 indicates a first propagation delay time to the UE 1, and T_pro2 indicates a second propagation delay to the UE 2.

Because the UE 1 is located nearer to the eNB as compared to the UE 2, the UE 2 has a relatively short propagation delay, for example, T_pro1 is 0.333 us, and T_pro2 is 3.33 us as illustrated in FIG. 4.

When both the UE 1 and the UE 2 power on or are in idle mode within a same cell of the eNB, an uplink timing of the UE 1, an uplink timing of the UE 2, and uplink timings of other UEs detected by the eNB in the cell may fail in executing synchronization. Reference number 401 denotes an uplink OFDM symbol transmission timing of the UE 1, and a reference number 403 denotes uplink OFDM symbol transmission timing of the UE 2.

By determining the uplink transmission propagation delays of the UE 1 and UE 2, the eNB may receive respective uplink OFDM symbols at the respective timings denoted by reference numbers 401, 403, and 405. The UE 1's uplink symbol transmitted at the timing 401 is received by the eNB at the timing 407, which includes a propagation delay, while the UE 2's uplink symbol transmitted at the timing 403 is received by the eNB at the timing 409, which includes a propagation delay. Since the timings 407 and 409 are before synchronization is acquired between the uplink transmission timings of the UE 1 and UE 2, the uplink OFDM symbol reception and decoding start timing 405 of the eNB, the UE 1's uplink OFDM symbol reception timing 407, and the UE 2's uplink OFDM symbol reception timing 409 are different among each other. In this case, the uplink symbols transmitted by the UE 1 and UE 2 have no orthogonality that may cause them interfere with each other and, as a consequence, the eNB is likely to fail in decoding the uplink symbols transmitted, at the timings 401 and 403, by the UE 1 and UE 2 due to the interference and the mismatch between the uplink symbol reception timings 407 and 409.

Uplink timing synchronization is a procedure for acquiring the eNB's uplink symbol reception timings with the UE 1 and UE 2. Additionally, if the uplink timing synchronization procedure completes, it is possible to acquire synchronization from among the eNB's uplink OFDM symbol reception and decoding timings of the eNB, as denoted by reference numbers 411, 413, and 415.

In the uplink timing synchronization procedure, the eNB transmits Timing Advance (TA) information to the UEs to notify them of a timing adjustment amount. The eNB may transmit the TA information in a Timing Advance Commence (TAC) MAC Control Element (TAC MAC CE) or in a Random Access Response (RAR) message sent in response to a random access preamble transmitted by a UE for initial access.

Figure 5:
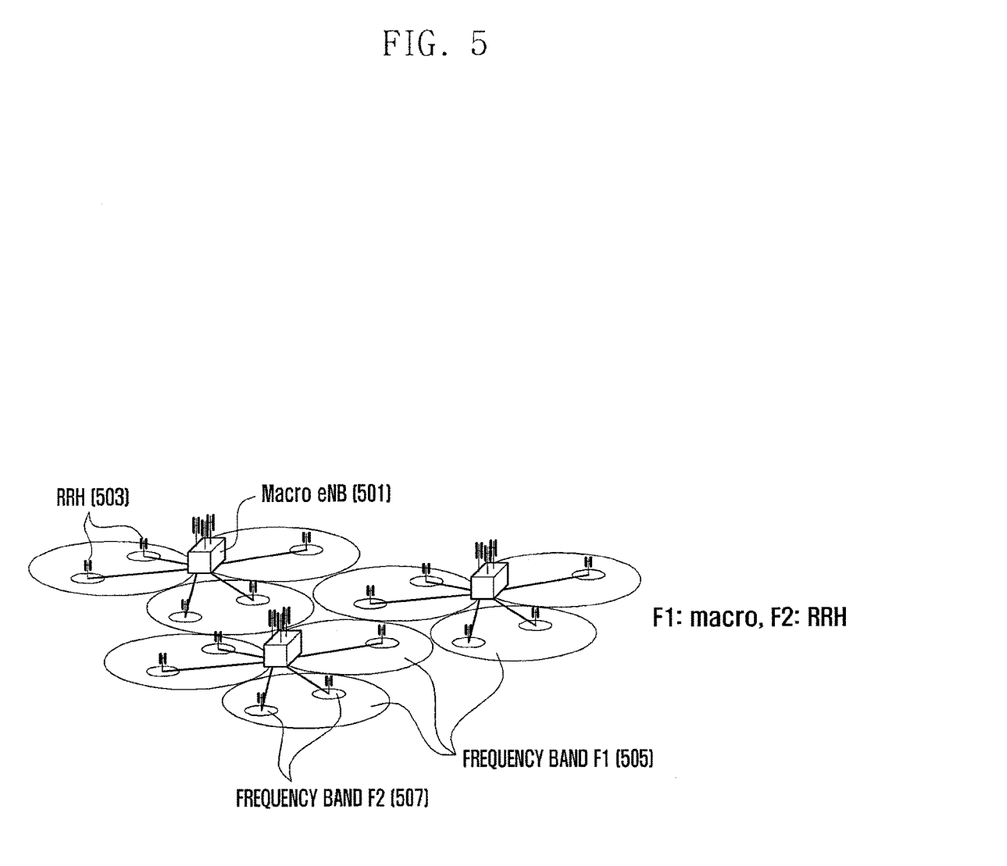
FIG. 5 is a diagram illustrating an exemplary network environment having network entities operating on a primary carrier and a secondary carrier at different locations in a system supporting carrier aggregation according to an exemplary embodiment of the present invention.

FIG. 5 is a diagram illustrating an exemplary network environment having network entities operating on a primary carrier and a secondary carrier at different locations in a system supporting carrier aggregation according to an exemplary embodiment of the present invention.

Remote Radio Heads (RRHs) 503 operating on frequency band F2 507 are around a macro eNB 501, which uses frequency band F1 505. If a UE is connected to both the macro eNB 501 and one of the RRHs 503 (i.e., if the frequency bands F1 and F2 are aggregated for uplink transmission of the UE located near the RRH), then the uplink and downlink transmission to and from the one of the RRHs 503 has a relatively short propagation delay and the uplink and downlink transmission to and from the macro eNB 501 has a relatively long propagation delay. Thus, there is a difference between the respective uplink transmission timings between the UE and the RRH and the UE and the macro eNB.

In the above carrier aggregation scenario, multiple uplink transmission timings should be configured and, in order to acquire initial uplink transmission timings, a random access procedure for the one of the RRHs 503 on F2 and to the macro eNB 501 on F1 should be performed. That is, carrier aggregation results in multiple uplink transmission timings, resulting in executing a random access procedure per cell in order to acquire uplink timing synchronization. According to an exemplary embodiment of the present invention, there is no need of performing the random access procedures to multiple cells at the same time.

In the present exemplary embodiments of the present invention, the macro eNB 501, or another eNB, categorizes the carriers having a same uplink timing into a group referred to as a Timing Advance Group (TAG). In an exemplary case wherein one PCell and three SCells A, B and C are aggregated, if the PCell and the SCell A have the same uplink timing and if the SCell B and SCell C have the same uplink timing, then the PCell and the SCell A are categorized as TAG 0 while the SCell B and SCell C are categorized as TAG 1.

Hereinafter, the TAG 0, to which the PCell belongs, is referred to as a Primary TAG (PTAG), and the TAG 1, to which the PCell does not belong, is referred to as a Secondary TAG (STAG). The PCell is the serving cell operating on the primary carrier and typically performs RRC Connection Establishment or RRC Connection Re-establishment or becomes a target of HandOver (HO). The exemplary embodiments of the present invention propose a method for handling the problem and/or failure occurring in a random access procedure for multiple cells.

Figure 6:
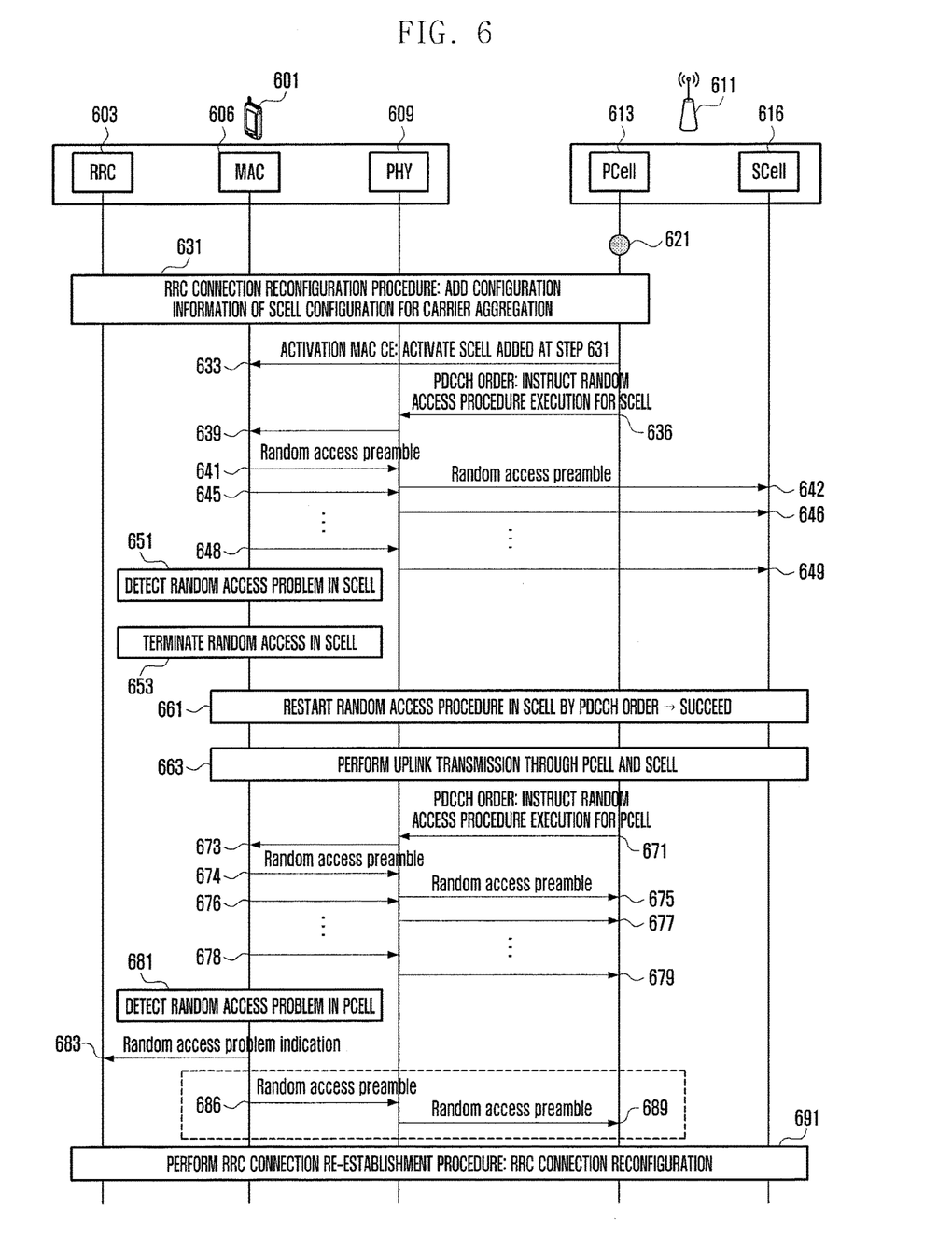
FIG. 6 is a signaling diagram illustrating a method for handling a problem and/or failure of a random access procedure in a system supporting carrier aggregation according to an exemplary embodiment of the present invention.

FIG. 6 is a signaling diagram illustrating a method for handling a problem and/or failure of a random access procedure in the system supporting carrier aggregation according to an exemplary embodiment of the present invention.

In a state where a UE 601 is connected to an eNB 611 through a PCell 613 of the eNB 611, which also includes the SCell 616, the eNB 611 determines a carrier aggregation configuration of the UE at step 621. Reference number 603 denotes an RRC protocol layer entity in the UE 601, reference number 606 denotes a MAC protocol layer entity in the UE 601, and reference number 609 denotes a PHY protocol layer entity in the UE 601. Once the carrier aggregation configuration of the UE 601 has been determined in step 621, then the eNB 611 transmits an RRC layer message, including the configuration information on the SCell 616 to be added for the carrier aggregation, such that the SCell 616 is added as a carrier aggregation target cell at step 631. At this time, the information on the uplink transmission timing of the SCell 616 is transmitted to the UE 601 along with an STAG IDentification (ID).

If the UE 601 is not maintaining the uplink timing of the STAG identified by the STAG ID, a new uplink transmission timing for the SCell 616 should be configured. The RRC layer message transmitted in step 631 may be the RRC Connection Reconfiguration message.

Afterward, the eNB 611 activates, if necessary, the SCell 616 added for the carrier aggregation at step 633. The SCell 616 activation command message may be the activation MAC CE message.

According to an exemplary embodiment of the present invention, it is assumed that the activated SCell 616 is to be configured with a new uplink timing different from the uplink timing which is maintained by the UE 601, which is for the uplink transmission timing for the PCell 613. In order to acquire the uplink timing information for the Scell 616, the eNB 611 commands the UE 601 to perform a random access procedure for the SCell 616 at step 636. The random access procedure command message may be a Physical Downlink Control Channel (PDCCH) order message. Next, at step 639, the PHY entity 609 notifies the MAC entity 606 of the random access procedure, and the MAC entity 606 selects a Random Access Preamble. Then, the MAC entity 606 notifies the PHY entity 609 of the selected Random Access Preamble at step 641, such that the PHY entity 609 transmits the Random Access Preamble to the eNB 611 at step 642.

If no reply is received in response to the Random Access Preamble, then the UE 601 transmits or retransmits the Random Access Preamble to the eNB 611 at steps 645, 646, 648 and 649. If the number of Random Access Preamble retransmissions is greater than a predetermined threshold value, then the MAC entity 606 determines that a problem and/or failure has arisen in the random access procedure at step 651.

If the random access problem and/or failure is detected in the SCell 616 at step 651, then the MAC entity 606 stops the random access procedure for the SCell 616 and stops retransmitting the Random Access Preamble at step 653.

Afterwards, the eNB 611 transmits the PDCCH order message so as to command the UE 601 to perform the random access procedure for the SCell 616, and it is assumed that the random access procedure for the SCell 616 is completed successfully so as to acquire the TA information and then uplink transmission timing at step 661. Once the uplink timing for the SCell has been acquired, it becomes possible to perform uplink scheduling for uplink transmission at step 663.

Next, the eNB 611 transmits the PDCCH order message so as to command the UE 601 to perform random access for the PCell 613 at step 671. The PHY entity 609 notifies the MAC entity 606 of the issuance of the random access procedure execution command at step 673. Next, the MAC entity 606 selects a Random Access Preamble and notifies the PHY entity 609 of the selected Random Access Preamble at step 674, and the PHY entity 609 transmits the Random Access Preamble to the eNB 611 at step 675.

If no reply is received in response to the Random Access Preamble, the UE 601 retransmits the Random Access Preamble again at steps 676, 677, 678, and 679. If the number of Random Access Preamble retransmissions is greater than a predetermined threshold value, then, at step 681, the MAC entity determines that a problem and/or failure arises in the random access procedure.

If the random access problem and/or failure is detected in the PCell 613 at step 681, then the MAC entity 606 notifies the RRC entity 603 of the random access problem and/or failure at step 683 such that the RRC entity 603 performs a RRC Connection Re-establishment procedure at step 691.

Although not depicted in FIG. 6, if notification regarding the random access problem and/or failure is provided, the RRC entity 603 waits for expiration of a RRC layer timer rather than performing the RRC connection reconfiguration and, if the random access problem continues, then the RRC entity 603 performs the RRC connection reconfiguration procedure. The RRC connection reconfiguration procedure may be the RRC Connection Re-establishment procedure and the RRC Connection Reconfiguration procedure.

The RRC Connection Reconfiguration procedure is performed in order to re-establish a signaling radio bearer and a data radio bearer and restart security, such as ciphering and an integrity check operation, on the radio interface under the assumption of a link breakage between the UE 601 and the eNB 611.

If the random access problem and/or failure arises in the PCell 613, then it is possible to maintain the random access procedure at step 686 and 689 before the RRC entity 603 instructs the MAC entity 606 to stop the random access procedure. That is, the Random Access Preamble may be retransmitted until a termination condition is fulfilled or an instruction is issued at the RRC entity 603, even after the random access problem and/or failure is detected. The random access termination condition on the RRC layer may be at least one of a start of the RRC Connection Re-establishment procedure, a change of a PCell, a an expiration of a specific RRC layer timer, or other similar events or conditions. Thus, the exemplary embodiment of FIG. 6 illustrates a method for handling the random access problem and/or failure selectively, according to whether the random access problem and/or failure is detected in a PCell or in an SCell. Although it is assumed that the random access procedure in the PCell is more important, the present invention may be implemented differently than that illustrated in FIG. 6. In other words, the random access problem and/or failure handling method for the PCell, as illustrated in FIG. 6, may also be used for handling a random access problem and/or failure for the SCell.

Although not depicted in FIG. 6, the random access problem and/or failure detected in both a PCell and an SCell may be notified from a MAC layer to an RRC layer according to another exemplary embodiment of the present invention. In this case, however, the RRC entity is to be notified of the random access problem and/or failure along with additional information on a cell or a TAG in which the random access problem and/or failure is detected, such that the RRC entity performs the RRC Connection reconfiguration procedure for the random access problem and/or failure of the PCell and reports the random access problem and/or failure of the SCell or the cell belonging to a STAG of the eNB. If the additional information is received, then the eNB may command performance of the random access again, may release the cell in which the random access problem and/or failure is detected, or may change a configuration of the cells involved in the carrier aggregation.

Figure 7:
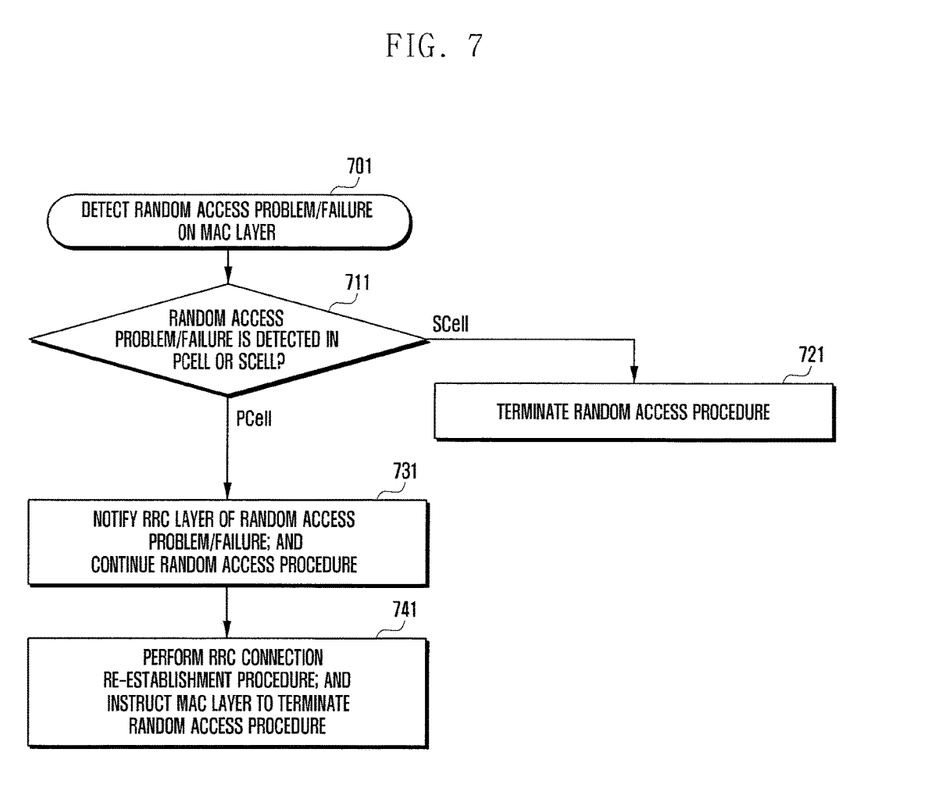
FIG. 7 is a flowchart illustrating a User Equipment (UE) procedure in the random access problem and/or failure handling method of FIG. 6 according to an exemplary embodiment of the present invention.

FIG. 7 is a flowchart illustrating a UE procedure in the random access problem and/or failure handling method of FIG. 6 according to an exemplary embodiment of the present invention.

The MAC layer detects a random access problem and/or failure in the random access procedure at step 701. The random access problem and/or failure may be determined when a number of retransmissions of a Random Access Preamble is greater than a predetermined threshold value. If the random access problem and/or failure is detected, then the UE determines whether the random access problem and/or failure is detected in the PCell or in the SCell at step 711. If the random access problem and/or failure is detected in the SCell, then the MAC layer stops or ends the random access procedure at step 721.

Otherwise, if the random access problem and/or failure is detected in the PCell, then the MAC layer notifies the RRC layer of the random access problem and/or failure and continues the random access procedure at step 731. If the random access problem and/or failure notification is received from the MAC layer, then the RRC layer performs an RRC Connection Reconfiguration procedure and, if a certain condition is fulfilled, commands the MAC layer to stop or end the random access procedure at step 741.

The condition to be fulfilled for the stopping or ending of the random access procedure at step 741 may be at least one of a start of RRC Connection Re-establishment procedure and an expiration of a certain RRC layer timer. Although not depicted in FIG. 7, once the random access problem and/or failure notification is received, the RRC layer may wait for the expiration of the RRC layer timer and, if the random access problem and/or failure is not overcome on the MAC layer yet, the RRC layer performs the RRC Connection Re-establishment procedure. If the random access procedure stop/end command is received from the RRC layer, then the MAC layer stops or ends the ongoing random access procedure.

Figure 8:
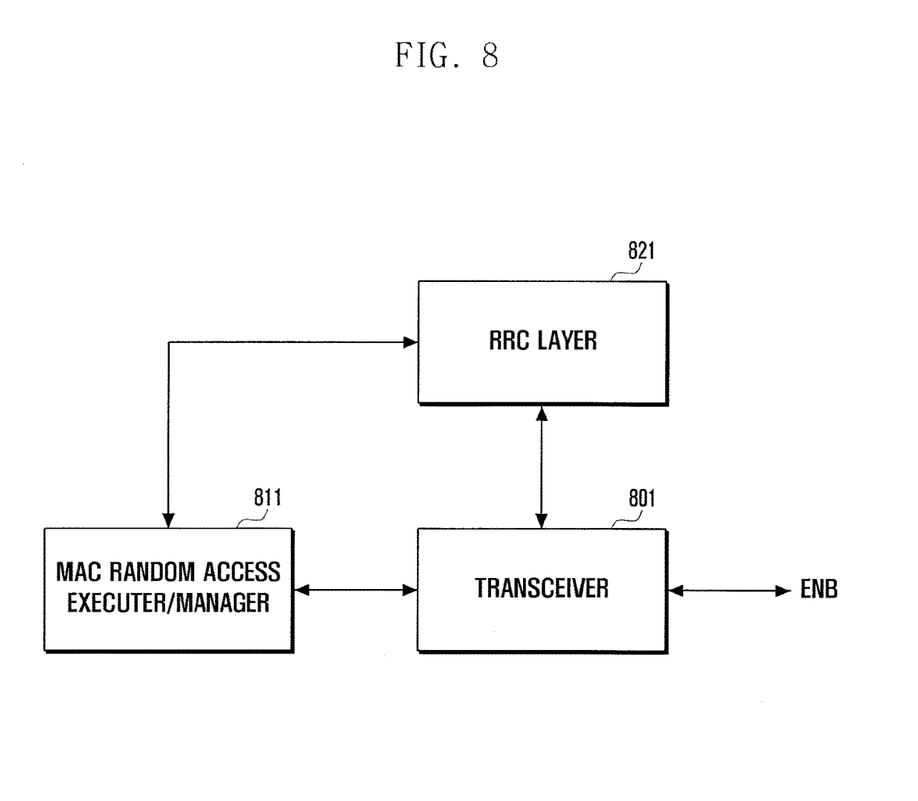
FIG. 8 is a block diagram illustrating a configuration of the UE of FIG. 6 according to an exemplary embodiment of the present invention.

FIG. 8 is a block diagram illustrating a configuration of the UE of FIG. 6 according to an exemplary embodiment of the present invention.

The UE includes a transceiver 801 which is responsible for communication with an eNB, a RRC layer entity 821, and a MAC random access executor/manager 811.

The RRC layer entity 821 generates an RRC control message to be transmitted to the eNB through the transceiver 801 and interprets an RRC control message received through the transceiver 801 in order to execute a procedure indicated by the interpreted message. If a random access problem and/or failure notification is received from the MAC layer entity, then the RRC layer entity 821 performs the related procedure and instructs the MAC layer entity to stop or end the random access procedure.

The MAC random access executor/manager 811 receives a random access procedure execution command for a specific cell from the eNB through the transceiver 801 or receives a random access procedure initiation command from the RRC layer entity in the UE and executes a random access procedure in response to a random procedure trigger from the MAC layer. Also, the MAC random access executor/manager 811 stops or ends the random access procedure automatically upon detection of a random access problem and/or failure or automatically notifies the RRC layer of the random access problem and/or failure. Although not depicted in FIG. 8, it is noted that the above described procedure is performed under the control of a controller, or another similar element or device.

In this case, the controller controls execution of the random access in the primary and secondary cells and monitors to detect random access problem and/or failure. The controller also determines whether the random access problem and/or failure is detected in the primary cell or the secondary cell and determines whether to continue the random access procedure according to the judgment result.

In detail, if the random access problem and/or failure is detected in the primary cell, then the controller controls to execute the RRC Connection Re-establishment procedure. According to an embodiment of the present invention, the controller starts a timer when the random access problem and/or failure is detected in the primary cell and, if the random access problem and/or failure is not recovered before the expiration of the timer, controls to execute the RRC Connection Re-establishment. Otherwise, if the random access problem and/or failure is detected in the second cell, then the controller controls to stop or end the random access procedure.

As described above, the random access problem and/or failure handling method of the present exemplary embodiments of the present invention is capable of handling the random access procedure efficiently when a random access problem is detected in the system configured with multiple uplink timings configured in the system.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method in a wireless communication system, the method comprising:
   transmitting, by a terminal, a random access preamble on one of a primary cell or a secondary cell;
   determining, by the terminal, that a number of transmissions of the random access preamble reaches a predetermined value;
   detecting a random access problem based on the determining that the number of transmissions of the random access preamble reaches the predetermined value;
   indicating, by the terminal, the random access problem to upper layers in response to the transmitting of the random access preamble being on the primary cell; and
   stopping, by the terminal, a random access procedure in response to the transmitting of the random access preamble being on the secondary cell.

2. The method of claim 1, further comprising:
   executing a radio resource control (RRC) connection re-establishment procedure in response to the transmitting of the random access preamble being on the primary cell.

3. The method of claim 2, further comprising:
   executing the RRC connection re-establishment procedure in response to the transmitting of the random access preamble being on the primary cell and the detected random access problem not being solved.

4. The method of claim 3, wherein the executing of the RRC connection re-establishment comprises:
   starting a timer in response to the transmitting of the random access preamble being on the primary cell; and
   stopping the executing of the RRC connection re-establishment procedure upon expiration of the timer.

5. The method of claim 1, wherein at least one of the number of transmissions of the random access preamble is based on a random access response not being received from the base station.

6. A terminal in a wireless communication system, the terminal comprising:
   a transceiver configured to transmit a random access preamble to a primary cell and to a secondary; and
   at least one processor configured to:
      control the transceiver to transmit the random access preamble on one of the primary cell or the secondary cell,
      determine that a number of transmissions of the random access preamble reaches a predetermined value,
      detect a random access problem based on the determination that the number of transmissions of the random access preamble reaches the predetermined value,
      indicate the random access problem to upper layers in response to controlling the transceiver to transmit the random access preamble on the primary cell, and
      stop a random access procedure in response to controlling the transceiver to transmit the random access preamble on the secondary cell.

7. The terminal of claim 6, wherein the at least one processor is further configured to execute a radio resource control (RRC) connection re-establishment procedure in response to controlling the transceiver to transmit the random access preamble on the primary cell and the detected random access problem not being solved.

8. The terminal of claim 7, wherein the at least one processor is further configured to:
   start a timer in response to controlling the transceiver to transmit the random access preamble on the primary cell, and
   execute the RRC connection re-establishment procedure in response to the detected random access problem not being solved.

9. The terminal of claim 8, wherein the at least one processor is further configured to stop the execution of the RRC connection re-establishment procedure upon expiration of the timer.

10. The terminal of claim 6, wherein at least one of the number of transmissions of the random access preamble is based on a random access response not being received from the base station.

* * * * *